US010450031B2

United States Patent
Djakovic et al.

(10) Patent No.: US 10,450,031 B2
(45) Date of Patent: Oct. 22, 2019

(54) GEARSHIFT FOR A BICYCLE AND BICYCLE WITH SUCH A GEARSHIFT

(71) Applicant: Schaeffler Technologies AG & Co. KG, Herzogenaurach (DE)

(72) Inventors: Boris Djakovic, Nuremberg (DE); Vincent Pommel, Erlangen (DE); Dagmar Munch, Frankfurt (DE); Matthias Herbrich, Furth (DE); Dietmar Rudy, Kleinbundenbach (DE); Christian Hecker, Furth (DE)

(73) Assignee: SCHAEFFLER TECHNOLOGIES AG & CO., KG, Herzogenaurach (DE)

( * ) Notice: Subject to any disclaimer, the term of this patent is extended or adjusted under 35 U.S.C. 154(b) by 158 days.

(21) Appl. No.: 15/309,339

(22) PCT Filed: Apr. 30, 2015

(86) PCT No.: PCT/DE2015/200293
§ 371 (c)(1),
(2) Date: Nov. 7, 2016

(87) PCT Pub. No.: WO2015/169313
PCT Pub. Date: Nov. 12, 2015

(65) Prior Publication Data
US 2017/0073040 A1 Mar. 16, 2017

(30) Foreign Application Priority Data

May 7, 2014 (DE) .................. 10 2014 208 479

(51) Int. Cl.
*B62M 6/45* (2010.01)
*B62M 6/50* (2010.01)
(Continued)

(52) U.S. Cl.
CPC ............ *B62M 6/50* (2013.01); *B62M 6/45* (2013.01); *B62M 6/55* (2013.01); *B62M 9/132* (2013.01);
(Continued)

(58) Field of Classification Search
CPC .......... B62M 6/50; B62M 11/06; B62M 6/55; B62M 6/45; B62M 25/08; B62M 9/132;
(Continued)

(56) References Cited

U.S. PATENT DOCUMENTS 5,059,158 A * 10/1991 Bellio .................. B62M 9/12
474/103
8,777,804 B2 * 7/2014 Takachi ................ B60W 20/10
180/206.3
(Continued)

FOREIGN PATENT DOCUMENTS

DE 4128866 3/1993
EP 0529664 3/1993
(Continued)

*Primary Examiner* — David J Hlavka
(74) *Attorney, Agent, or Firm* — Volpe and Koenig, P.C.

(57) ABSTRACT

A gearshift for a bicycle having an electric auxiliary drive including a stepped gear system which is embodied as a hub gear system or derailleur system, and an electromechanical actuator for triggering a gear change of the gear system. The electromechanical actuator has a shift control unit which can be or is connected via a data line to a drive control unit of the auxiliary electric drive, which shift control unit is designed to activate the actuator as a function of at least one state parameter transmitted to the shift control unit by the drive control unit, or as a function of an item of information derived from said state parameter.

10 Claims, 2 Drawing Sheets

(51) Int. Cl.
  *B62M 9/132*   (2010.01)
  *B62M 25/08*   (2006.01)
  *B62M 6/55*    (2010.01)
  *B62M 11/06*   (2006.01)
  *F16H 25/20*   (2006.01)
  *F16H 25/22*   (2006.01)
(52) U.S. Cl.
  CPC ............ *B62M 11/06* (2013.01); *B62M 25/08* (2013.01); *F16H 25/20* (2013.01); *F16H 25/2204* (2013.01); *F16H 25/2252* (2013.01)
(58) Field of Classification Search
  CPC ... F16H 25/2252; F16H 25/2204; F16H 25/20
  See application file for complete search history.

(56) References Cited

U.S. PATENT DOCUMENTS

| | | | |
|---|---|---|---|
| 8,820,459 B2* | 9/2014 | Hashimoto | B62M 6/55 180/206.3 |
| 9,933,059 B2* | 4/2018 | Klode | F16H 25/2204 |
| 2013/0054102 A1* | 2/2013 | Cheng | B62M 25/08 701/55 |
| 2013/0090819 A1* | 4/2013 | Cheng | B62M 6/45 701/64 |

FOREIGN PATENT DOCUMENTS

| | | |
|---|---|---|
| EP | 2562073 | 2/2013 |
| EP | 2581299 | 4/2013 |
| WO | 9117078 | 11/1991 |

* cited by examiner

GEARSHIFT FOR A BICYCLE AND BICYCLE WITH SUCH A GEARSHIFT

BACKGROUND

The invention relates to a gearshift for a bicycle with an electric auxiliary drive, comprising a stepped gear system formed as a gear hub system or derailleur gear system and an electromechanical actuator for triggering a gear change of the gear system.

Bicycles are usually equipped with a gearshift whose gear system can be constructed as a gear hub system or as a derailleur gear system. The rider selects the appropriate gear by a hand switch that can be constructed, e.g., as a rotary switch mounted on the handle bar. This switch is connected to the gear system by a Bowden cable. In addition to rotary switches, toggle or rocker switches mounted on the handle bar or on a frame part are also common.

An electromechanical gearshift for a bicycle is known from DE 41 28 866 A1. This gearshift comprises a control switch, a gear system, for example, a gear hub or a derailleur gear system, and an electromechanical adjustment device. The adjustment device is coupled with a Bowden cable, so that the gear system can be switched off by a shifting of the adjustment device.

Conventional gearshifts for a bicycle can be shifted at any time, in particular, also under loading, that is, when the torque transmitted from the rider to the pedals is at a maximum. Both for gear hub systems and also derailleur gear systems, however, increased wear occurs when they are shifted under high loading.

Bicycles with electric auxiliary drives are also affected by this problem. Typically, the rider reduces the driving power before a manual shifting operation, then manually performs the shifting operation, and then he can reset, that is, increase the driving power again, wherein this control procedure is also carried out manually. A proper and material-preserving operation of a conventional gearshift for a bicycle with an electric auxiliary drive is therefore not especially convenient or easy to operate.

SUMMARY

The invention is therefore based on the object of providing a gearshift that enables simple operation and gear changing that is easy on materials.

To achieve this object, it is provided according to the invention for a gearshift of the type specified above that the electromechanical actuator has a shift control unit that can be connected or is connected by a data line to a drive control unit of the electric auxiliary drive and is constructed to activate the actuator as a function of at least one state parameter transmitted from the drive control unit to the shift control unit or as a function of information derived from this parameter.

The invention involves the knowledge that communications between the drive control unit of the electric auxiliary drive and the shift control unit that actuates the electromechanical actuator is required to prevent a shifting operation from being performed at an unfavorable point in time. An unfavorable point in time is, for example, when the electric auxiliary drive is operated at a high power. In addition, a change of gears is unfavorable when the bicycle rider applies a high torque via the pedals. According to the invention it is therefore provided to define the point in time of a gear change as a function of a state parameter that is provided by the drive control unit. Instead of a state parameter, information derived from this parameter could also be used to define the point in time of the triggering of the electromechanical actuator.

For the gearshift according to the invention, it is preferred that at least one state parameter of the following group can be transmitted from the drive control unit to the shift control unit: the position of a pedal detected by a pedal sensor, pedal rotational speed, traveling speed, the torque applied by a rider. These state parameters are needed at least partially for controlling or regulating the electric auxiliary drive so that these state parameters are already detected so that, in most cases, no additional hardware components are required. On the other hand, corresponding sensors of the gearshift can be largely eliminated due to the transmission of at least one state parameter provided according to the invention.

In the scope of the invention it is especially preferred that the shift control unit is constructed to determine a point in time at which a pedal passes a bottom or top dead center point with reference to at least one transmitted state parameter. When a pedal is located at its top or bottom dead center point, the rider can apply no or at best a very small torque; therefore it is favorable to trigger a shifting operation precisely at this moment. Accordingly, for the gearshift according to the invention, the actuator is activated at this point in time defined with reference to the at least one transmitted state parameter, so that the shifting operation is performed in a way that preserves material.

By the use of the pedal sensor, the position of a pedal can be detected and a point in time at which a pedal passes a dead center point can be calculated from this information. Alternatively or additionally, the pedal rotational speed can also be considered as a state parameter in order to determine a favorable point in time for a shifting operation. The same applies for the traveling speed and/or the torque transmitted from a rider to the pedals.

In the scope of the invention it can be provided that the shifting operation is shifted, in particular, advanced in time slightly with respect to reaching a dead center point. Here, a shifting operation can then be triggered by the shift control unit when a pedal is located, for example, 20° or 10° in front of the top or bottom dead center point of a pedal.

In addition, for the gearshift according to the invention it can be provided that the drive control unit controls the electric auxiliary drive at the point in time of a gear change so that the drive power generated by the electric auxiliary drive is reduced or even switched off. To do this, the shift control unit can transmit the point in time of an upcoming gear change to the drive control unit via the data line.

In another construction of the invention, it can be provided that the gearshift or the actuator has an inclination sensor that is constructed for detecting the inclination in the pitch direction and/or in the roll direction and the shift control unit is constructed to consider the detected inclination when defining a point in time for a gear change. An inclination in the pitch direction corresponds to a rotation about the transverse axis of the bicycle. By the use of the inclination detected by the inclination sensor it can be determined whether the bicycle is located on a rising slope or a falling slope. The roll direction indicates an inclination about the longitudinal axis of the bicycle; if a corresponding value has been detected by the inclination sensor it can be determined whether a curve is currently being traveled on. The information whether the bicycle is moving up or down a slope is needed for an automatic shifting process. The information concerning a curve length is required because the shift control unit does not trigger a shifting operation while the bicycle is riding around a curve.

The gearshift according to the invention can optionally also perform automatic gear changes. To do this, it can be constructed so that it defines a gear of the gear system into which it is shifted by the electromechanical actuator.

The actuator provided in the gearshift according to the invention can preferably be constructed as a linear actuator, in particular, as a planetary roller spindle drive or as a ball screw or as a sliding spindle drive. In general, all linear actuators that have an electric drive and are distinguished by low installation space and low mass are suitable, so that they are suitable for installation in or mounting on a bicycle.

It is also possible that the actuator of the gearshift according to the invention has a direct or indirect linear encoder that enables the position to be detected using a magnetic or inductive or capacitive or potentiometric or magnetostrictive or magnetoresistive or optical measuring principle. In the case of an indirect measurement, the position is detected by means of a rotary encoder that measures and detects the rotation of the motor shaft. For this purpose, a rotary encoder can be mounted on a motor shaft of the actuator. The indirect measurement is performed according to the Hall principle or an optical or magnetoresistive method.

In the gearshift according to the invention it is preferred that the electromechanical actuator is connected to a power source such as an accumulator of the electric auxiliary drive. Alternatively, the electromechanical actuator could also have its own energy storage device, such as an accumulator or a battery or a capacitor that supplies it with power. It is also possible that the actuator can be connected or is connected to a dynamo of the bicycle. In this construction, the actuator receives the energy required for the operation from the dynamo.

The term "bicycle" comprises both so-called ped-elecs and e-bikes, as well as exercise and fitness bikes that are built like bicycles and bicycles in the classical sense. In all of these devices, it is essential that a shifting operation takes place in a non-loaded state or at a point in time of lowest loading, in order to reduce noises, vibrations, and wear.

BRIEF DESCRIPTION OF THE DRAWINGS

One embodiment of the invention is shown in the drawings and is described in more detail below. Shown are.

DETAILED DESCRIPTION OF THE PREFERRED EMBODIMENTS

Figure 1:
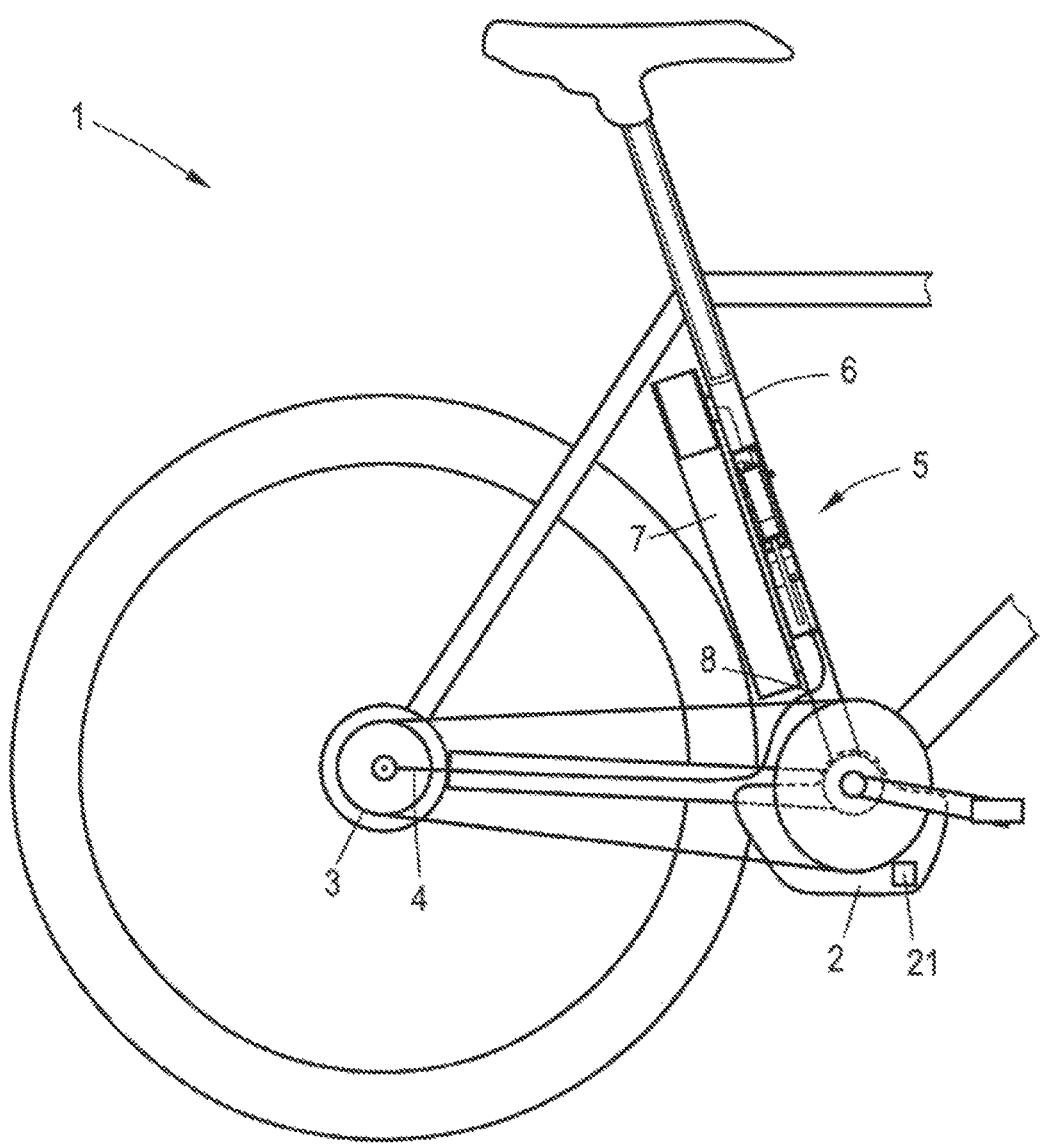
FIG. 1 the essential components of a bicycle according to the invention with a gearshift according to the invention, and FIG. 2 a sectioned view of an actuator of a gearshift according to the invention.

FIG. 1 shows the essential components of a bicycle 1 with an electric auxiliary drive 2 that is arranged in the area of the bottom bracket. The bicycle 1 has a stepped gear system that is constructed as a gear hub system 3. The gear hub system 3 has a planetary gear that is shifted by a Bowden cable 4.

The gearshift comprises an electromechanical actuator 5 that is constructed as a rod actuator and is arranged in the interior of the seat tube 6 of the bicycle 1.

The bicycle 1 comprises an accumulator 7 that provides the required electrical energy both for the auxiliary drive 2 and also for the actuator 5.

The Bowden cable 4, whose one end is connected to the gear hub system 3, is guided in a Bowden sleeve. Starting from the gear hub system 3, the Bowden cable 4 initially runs horizontally, then it passes two reversing points and opens into the actuator 5. The seat tube has, on one side, a hole 8 through which the Bowden sleeve is led through the seat tube 6.

Figure 2:
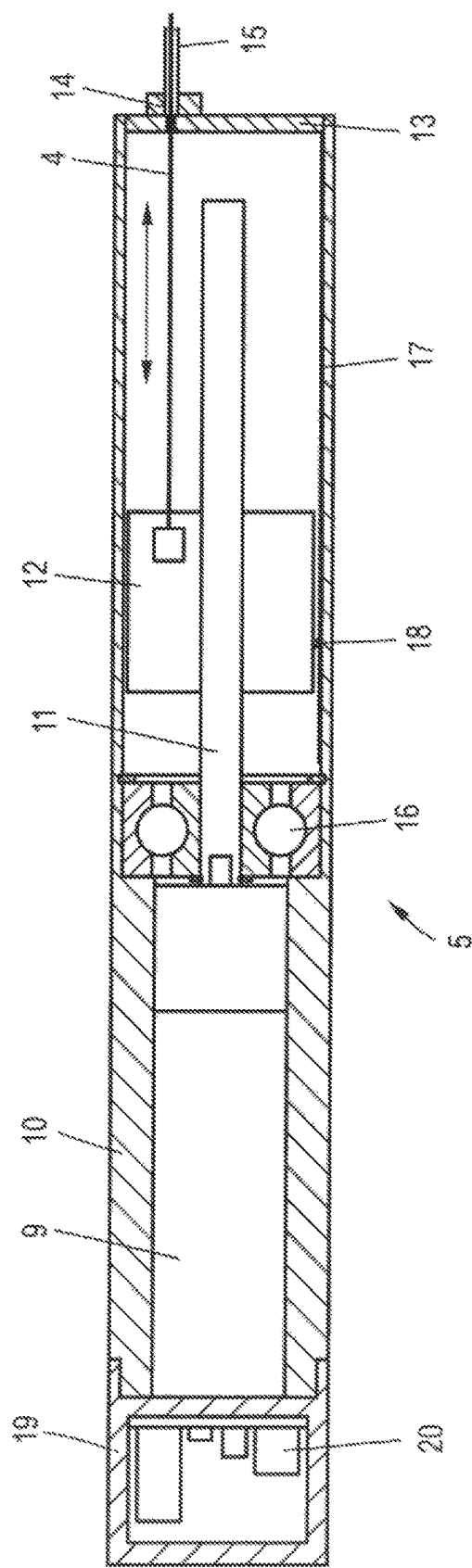

FIG. 2 is a sectioned side view of the actuator 5. The actuator 5 constructed as a linear rod actuator is relatively narrow and long, so that it can be inserted into the seat tube 6 shown in FIG. 1. In principle, the actuator could also be arranged in a different frame tube of a bicycle frame or alternatively in a separate housing.

The actuator 5 comprises an electric motor 9 that is arranged in an actuator housing 10. The electric motor 9 drives a spindle 11 that in turn drives a spindle nut 12. The spindle 11 has a single thread construction in the shown embodiment. Constructions with multiple thread grooves are also conceivable. In principle, a sliding spindle, a ball screw, or a planetary roller drive could be used as the spindle drive.

A cover 13 that closes the actuator housing 10 is provided on the bottom end in the installed state. The cover 13 has an opening 14 for the Bowden cable 4 that has, outside of the actuator housing 10, a Bowden sleeve 15 that is supported in the area of the opening 14 on the cover 13.

In FIG. 2, it can be seen that the spindle 11 is supported axially by a grooved ball bearing 16 opposite the actuator housing 10. In the actuator housing 10, a linear scale 17 is mounted with which the axial position of the spindle nut 12 can be detected. For this purpose, the spindle nut 12 has a contact piece 18 that contacts the linear scale 17 formed as a potentiometer strip. By the use of the contact piece 18 that can be moved with respect to the linear scale 17 constructed as a potentiometer strip, the axial position of the spindle nut 12 relative to the linear scale 17 can be determined. By the use of the potentiometer strip, a changing resistance value is determined that is proportional to the position of the spindle nut 12. In addition, other physical measurement principles are also conceivable on which a linear sensor can be based. These include, e.g., magnetoresistive, magnetorestrictive, capacitive, inductive, or optical measuring principles.

Another housing section 19 in which a shift control unit 20 is arranged is attached to the actuator housing 10 on the end opposite the cover 13. The shift control unit 20 determines an exact point in time for the shifting operation, as well as the shifting step of the gear hub 3 and actuates the actuator 5 accordingly, so that the gear change is triggered.

The electric auxiliary drive 2 has a drive control unit 21 that is shown schematically in FIG. 1 and is connected to the shift control unit 20 via a data line (not shown). The data line is constructed so that both data can be transmitted both from the drive control unit 21 to the shift control unit 20 and also from this to the drive control unit 21; an exchange of data in both directions is thus possible.

So that the shift control unit 20 can determine the exact point in time for a shifting operation and the appropriate shift step, state parameters are needed as input parameters. The shift control unit 20 considers the size of the torque that the rider exerts via the pedals on the bottom bracket shaft; the size of the torque, however, is an optional parameter that is not absolutely required. The shift control unit 20, however, requires the pedal rotational speed or the position of a pedal, so that the correct point in time for triggering the shifting operation can be selected. The shift control unit 20 is constructed so that it triggers a shifting operation when the torque is at a minimum. Therefore, a shifting operation takes place when a pedal is at the top dead center point of its rotational motion. The pedal rotational speed or the position of a pedal is here calculated from the time profile of the torque. The torque or the pedaling moment has essentially a sinusoidal profile; the greatest torque is then achieved when the pedals are located in a horizontal position. In this state, the force applied by the rider can act approximately perpendicular to the pedal; accordingly, the torque is at a maximum at this point in time. In one pedal rotation, this takes place a maximum of two times. The two maximum values are offset by 180° relative to each other. Between the two maximum values there is a position in which the pedals are vertical. In this situation, the transmitted torque is at a minimum. If a shifting operation is triggered at this moment, the wear can be minimized, which would increase the service life of the gear system.

As another input parameter, the speed of the bicycle can be considered. Both the instantaneous torque and also the speed are provided as state parameters in the drive control unit 21 and are transmitted via the data line to the shift control unit 20. Optionally, the inclination of the bicycle can be considered as another input parameter. For this purpose, the shift control unit 20 comprises an inclination sensor that detects at least the inclination in the pitch direction and also in the roll direction. With reference to the determined value for the pitch direction, it can be determined whether the bicycle is moving up or down a slope. With reference to the determined value for the roll direction, it can be determined whether the bicycle is in a curve position, that is, whether the bicycle is currently moving along a curve. If the shift control unit 20 determines that the bicycle is moving along a curve, a shifting operation is not performed until the curve is completed. The information whether the bicycle is moving up or down a slope can be used for determining an appropriate gear stage.

If the torque applied by the rider and the speed are transmitted from the drive control unit 21 to the shift control unit 20, the additionally required pedal position can be calculated by the shift control unit 20. A calculation by the actuator 5 is also possible. A possible inclination of the bicycle 1 is detected by the inclination sensor integrated in the circuit unit 20. A shifting point in time and an optimum gear (gear stage) is calculated from these input parameters. The shift control unit 20 actuates the actuator 5 so that it triggers the shifting operation by moving the Bowden cable 4 at exactly the required point in time.

The shift control unit 20 transmits a signal to the drive control unit 21 of the auxiliary drive 2 via the data line, so that this reduces or even stops the drive power during a shifting operation, in order to prevent or minimize wear on the gear hub 3.

In an alternative determination of the shifting point in time, the shift control unit 20 receives the pedal rotational speed and the speed of the bicycle from the drive control unit 21. The position of the pedal can be determined from the pedal rotational speed. From this information transmitted from the drive control unit 21 to the shift control unit 20, that is, from the pedal rotational speed and the pedal position, as well as from the speed of the bicycle, the shift control unit 20 calculates the most favorable shifting point in time when a pedal is located at its dead center point and actuates the actuator 5 accordingly. In addition, an optimum gear is calculated so that the desired shifting operation can be performed. In this variant, the drive control unit 21 also receives a signal from the shift control unit 20, so that the drive power of the electric auxiliary drive 2 is reduced or switched off during a shifting operation.

LIST OF REFERENCES NUMBERS

1 Bicycle
2 Auxiliary drive
3 Gear hub
4 Bowden cable
5 Actuator
6 Seat tube
7 Accumulator
8 Hole
9 Electric motor
10 Actuator housing
11 Spindle
12 Spindle nut
13 Cover
14 Opening
15 Bowden sleeve
16 Grooved ball bearing
17 Linear scale
18 Contact piece
19 Housing section
20 Shift control unit
21 Drive control unit

The invention claimed is:

1. A gearshift for a bicycle with an electric auxiliary drive, comprising a stepped gear system formed as a hub gear system or derailleur gear system and an electromechanical actuator for triggering a gear change of the gear system, the electromechanical actuator has a shift control unit that is connectable via a data cable to a drive control unit of the electric auxiliary drive, the electric auxiliary drive being configured to both (i) be switched off and (ii) to activate the electromechanical actuator as a function of at least one state parameter transmitted from the drive control unit to the shift control unit or information derived from said parameter, wherein the at least one state parameter includes a bicycle traveling speed or a torque.

2. The gearshift according to claim 1, wherein the shift control unit is constructed to determine, with reference to the at least one transmitted state parameter, a point in time at which a foot pedal passes a bottom or top dead center point, and the shift control unit activates the electromechanical actuator before or at said point in time.

3. The gearshift according to claim 2, wherein the shift control unit is constructed to trigger the shifting process as a function of a pedaling frequency and under consideration of a required shifting stroke of the gear system when a pedal is located in front of the bottom or top dead center point.

4. The gearshift according to claim 1, further comprising an inclination sensor that is constructed for detecting an inclination in at least one of a pitch direction or in a roll direction and the shift control unit is constructed to consider a detected inclination for defining a point in time for a gear change.

5. The gearshift according to claim 1, wherein the shift control unit is constructed to define a gear of the gear system into which it is shifted by the electromechanical actuator.

6. The gearshift according to claim 1, wherein the electromechanical actuator is a linear actuator that is constructed as a planetary roller spindle drive, a ball screw, or a sliding spindle drive.

7. The gearshift according to claim 1, wherein the electromechanical actuator has a direct or indirect linear encoder that enables a position to be detected using a magnetic or inductive or capacitive or potentiometric or magnetostrictive or magnetoresistive measuring principle.

8. The gearshift according to claim 7, wherein the indirect linear encoder is constructed to measure a shifting position by a rotary encoder mounted on a motor shaft of the electromechanical actuator, and the indirect measurement is carried out using an optical or magnetoresistive method or according to the Hall principle.

9. The gearshift according to claim 1, wherein the electromechanical actuator is connected to a power source.

10. A bicycle including the electric auxiliary drive and the gearshift according to claim 1, wherein the electromechanical actuator is arranged in a frame part or a frame tube of the bicycle.

* * * * *